US012578798B2

(12) United States Patent
Kondo et al.

(10) Patent No.: US 12,578,798 B2
(45) Date of Patent: Mar. 17, 2026

(54) HAPTIC DEVICE, CONTROL DEVICE FOR HAPTIC DEVICE, AND CONTROL METHOD FOR HAPTIC DEVICE

(71) Applicant: SONY GROUP CORPORATION, Tokyo (JP)

(72) Inventors: Masao Kondo, Tokyo (JP); Junichi Shimizu, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 291 days.

(21) Appl. No.: 18/250,270

(22) PCT Filed: Oct. 22, 2021

(86) PCT No.: PCT/JP2021/039063
§ 371 (c)(1),
(2) Date: Apr. 24, 2023

(87) PCT Pub. No.: WO2022/091958
PCT Pub. Date: May 5, 2022

(65) Prior Publication Data
US 2024/0019935 A1      Jan. 18, 2024

(30) Foreign Application Priority Data

Nov. 2, 2020    (JP) ................................. 2020-183837

(51) Int. Cl.
G06F 3/01         (2006.01)
A63F 13/211        (2014.01)
(Continued)

(52) U.S. Cl.
CPC ............ G06F 3/016 (2013.01); A63F 13/211 (2014.09); A63F 13/24 (2014.09); A63F 13/285 (2014.09);
(Continued)

(58) Field of Classification Search
CPC ...... A63F 13/24; A63F 13/211; A63F 13/285; A63F 2300/1037; G06F 3/016; G06F 3/0346
See application file for complete search history.

(56) References Cited

U.S. PATENT DOCUMENTS

| | | | |
|---|---|---|---|
| 10,996,757 B2 * | 5/2021 | Raghoebardajal | ...... G06F 3/016 |
| 2005/0017454 A1 * | 1/2005 | Endo | ..................... A63F 13/213 |
| | | | 463/2 |

(Continued)

FOREIGN PATENT DOCUMENTS

| | | |
|---|---|---|
| JP | 10-214155 A | 8/1998 |
| JP | 2000-308756 A | 11/2000 |

(Continued)

OTHER PUBLICATIONS

International Search Report and Written Opinion of PCT Application No. PCT/JP2021/039063, issued on Jan. 18, 2022, 11 pages of ISRWO.

*Primary Examiner* — David L Lewis
*Assistant Examiner* — Shauna-Kay Hall
(74) *Attorney, Agent, or Firm* — CHIP LAW GROUP

(57) ABSTRACT

A haptic device includes an external grasp body that is positioned on an outside, formed as a grasp portion of an imaginary object, and grasped by an operator, a motion detection unit that is provided in the external grasp body to detect a motion of the external grasp body, and an internal drive body that is provided in the external grasp body, connected to the external grasp body, and moves relative to the external grasp body on the basis of a result of the detection by the motion detection unit.

9 Claims, 7 Drawing Sheets

(51) Int. Cl.
    *A63F 13/24*           (2014.01)
    *A63F 13/285*         (2014.01)
    *G06F 3/0346*         (2013.01)

(52) U.S. Cl.
    CPC .... *G06F 3/0346* (2013.01); *A63F 2300/1037*
            (2013.01); *G06F 2203/013* (2013.01)

(56)             References Cited

U.S. PATENT DOCUMENTS

| | | | |
|---|---|---|---|
| 2009/0231272 A1* | 9/2009 | Rogowitz | G06F 3/04815 |
| | | | 345/156 |
| 2011/0018697 A1* | 1/2011 | Birnbaum | A63F 13/10 |
| | | | 340/407.2 |
| 2011/0121953 A1 | 5/2011 | Grant et al. | |
| 2014/0118127 A1* | 5/2014 | Levesque | G08B 6/00 |
| | | | 340/407.2 |
| 2020/0264703 A1* | 8/2020 | Leake | G06F 3/011 |
| 2022/0111295 A1* | 4/2022 | Schroeder | G06F 3/016 |

FOREIGN PATENT DOCUMENTS

| | | | |
|---|---|---|---|
| JP | 2008-113845 A | 5/2008 |
| JP | 2010-225155 A | 10/2010 |
| JP | 2018-507490 A | 3/2018 |
| WO | 2002/073385 A1 | 9/2002 |
| WO | 2016/116182 A1 | 7/2016 |

* cited by examiner

P1

10

P2

10

FEELING OF
BENDING

P3

10

P4

10

P5

10

BEFORE
OPERATION

AFTER
OPERATION

START

ACQUIRE PHYSICAL QUANTITIES SUCH AS SHAPE AND MATERIAL OF VIRTUAL OBJECT — S1

ACQUIRE MOTION OF HAPTIC DEVICE (OUTPUT VALUE FROM ACCELERATION SENSOR) — S2

PHYSICAL OPERATION FOR BEHAVIOR OF VIRTUAL OBJECT — S3

CONVERT RESULT OF CALCULATION INTO CONTROL VALUE FOR SERVO MOTOR — S4

PERFORM CONTROL OF SERVO MOTOR BASED ON CONTROL VALUE — S5

END

HAPTIC DEVICE, CONTROL DEVICE FOR HAPTIC DEVICE, AND CONTROL METHOD FOR HAPTIC DEVICE

CROSS REFERENCE TO RELATED APPLICATIONS

This application is a U.S. National Phase of International Patent Application No. PCT/JP2021/039063 filed on Oct. 22, 2021, which claims priority benefit of Japanese Patent Application No. JP 2020-183837 filed in the Japan Patent Office on Nov. 2, 2020. Each of the above-referenced applications is hereby incorporated herein by reference in its entirety.

FIELD

The present disclosure relates to a haptic device, a control device for the haptic device, and a control method for the haptic device.

BACKGROUND

There is known a conventional game device that uses a controller for the game device to control the movement of an object in a virtual space (e.g., see Patent Literature 1). In Patent Literature 1, a game device performs correction so that a displacement amount calculated on the basis of position information of the controller becomes zero. Therefore, even if accuracy in the position of the controller acquired from the controller is low, the game device suppresses vibration such as camera shake that may occur in the object in the virtual space.

CITATION LIST

Patent Literature

Patent Literature 1: JP 2008-113845 A

SUMMARY

Technical Problem

Meanwhile, an input device such as a controller may be used as a haptic device that presents the sense of touch to an operator. However, there is no known haptic device that presents a behavior in a grasp portion of an imaginary object, as a haptic device that presents a sense of touch relating to a behavior of the imaginary object to the operator. The imaginary object represents, for example, a fishing rod, a golf club, or the like, and the behavior in the grasp portion represents, for example, torsional deformation between an external structure such as a grip and an internal structure such as a shaft.

Therefore, the present disclosure proposes a haptic device, a control device for the haptic device, and a control method for the haptic device that are configured to present the sense of touch relating to a behavior in a grasp portion of an imaginary object, to an operator.

Solution to Problem

In order to solve the above problem, a haptic device according to one aspect of the present disclosure includes: an external grasp body that is positioned on an outside, formed as a grasp portion of an imaginary object, and grasped by an operator; a motion detection unit that is provided in the external grasp body to detect a motion of the external grasp body; and an internal drive body that is provided in the external grasp body, connected to the external grasp body, and moves relative to the external grasp body based on a result of the detection by the motion detection unit.

Moreover, a control device for a haptic device according to one aspect of the present disclosure, the control device controlling the above haptic device, the control device includes: acquiring a physical quantity relating to the imaginary object; acquiring the result of the detection by the motion detection unit; generating a control signal for the internal drive body to reproduce a behavior of the imaginary object based on the acquired physical quantity and the acquired result of the detection; and controlling the internal drive body based on the generated control signal.

Moreover, a control method for a haptic device according to one aspect of the present disclosure, the method controlling the haptic device according to claim 1, the method comprising: acquiring a physical quantity relating to the imaginary object; acquiring the result of the detection by the motion detection unit; generating a control signal for the internal drive body to reproduce a behavior of the imaginary object based on the acquired physical quantity and the acquired result of the detection; and controlling the internal drive body based on the generated control signal.

DESCRIPTION OF EMBODIMENTS

Figure 1:
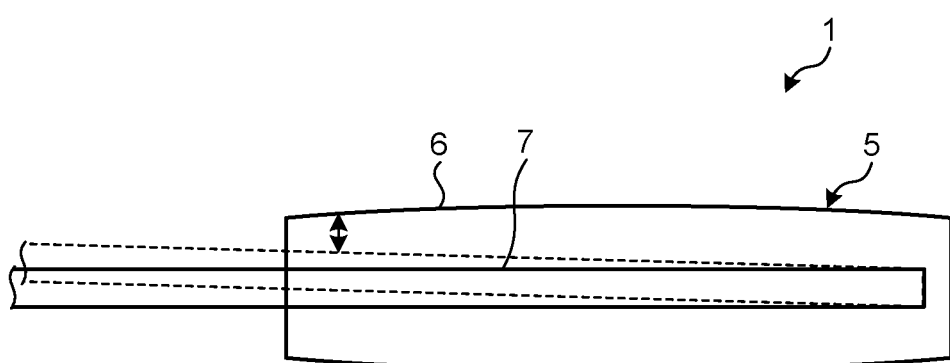
FIG. 1 is a diagram illustrating an example of a grasp portion in an imaginary object of the present disclosure.

Embodiments of the present disclosure will be described below in detail with reference to the drawings. Note that in the following embodiments, the same portions are denoted by the same reference numerals and symbols, and a repetitive description thereof will be omitted.

First Embodiment

A haptic device 10 and a control device 11 according to a first embodiment of the present disclosure present a sense of touch to an operator who operates the haptic device 10 in a manner to reproduce a behavior in a grasp portion of an imaginary object (hereinafter, also referred to as virtual object) 1. Prior to the description of the haptic device 10 and the control device 11, the virtual object 1 will be described.

Imaginary Elongated Object

FIG. 1 is a diagram illustrating an example of the grasp portion in the imaginary object of the present disclosure. The object shown in FIG. 1 is the virtual object 1 having the grasp portion 5, and is, for example, an elongated object such as a golf club or a fishing rod. Note that the virtual object 1 is not limited to the elongated object, but is not particularly limited as long as the virtual object 1 has the grasp portion 5. The virtual object 1 may be, for example, a sword, a pendulum, a throttle of a motorcycle, a control stick of an aircraft, or the like. In addition, the virtual object 1 may be an object having a large bulge at one end portion (an end portion opposite to the grasp portion), such as a badminton racket. The grasp portion 5 of the virtual object 1 in the first embodiment includes an outer grip 6 and a shaft 7 provided inside the grip 6. The shaft 7 is elongated so that the axial direction extends in a longitudinal direction. The grip 6 is provided so as to cover the outer periphery of the shaft 7, and is provided over the entire periphery of the shaft 7. The behavior in the grasp portion of the virtual object 1 to be reproduced is torsional deformation of the grip 6 relative to the shaft 7.

Figure 2:
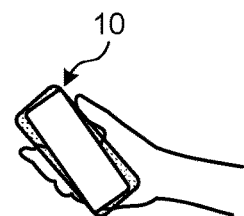
FIG. 2 is a diagram illustrating examples of a behavior of the grasp portion in the imaginary object.
Figure 2:
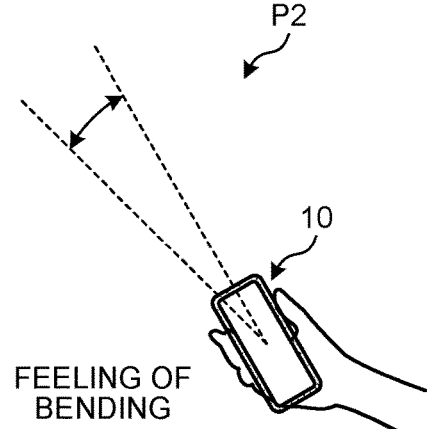
Figure 2:
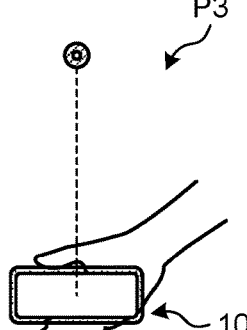
Figure 2:
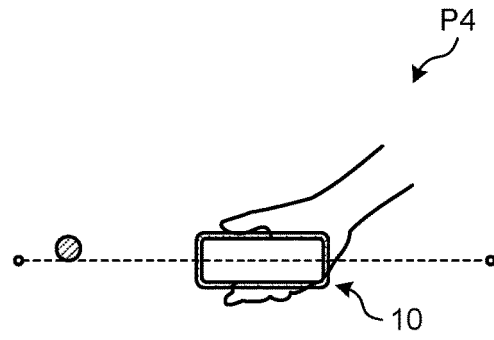
Figure 2:
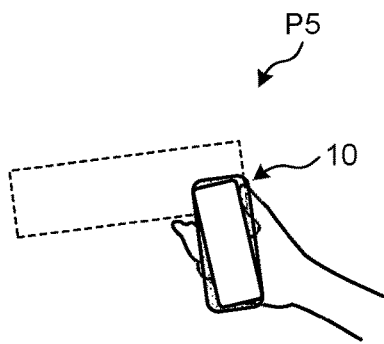

Here, the behavior in the grasp portion 5 of the virtual object 1 will be exemplified with reference to FIG. 2. FIG. 2 is a diagram illustrating examples of the behavior of the grasp portion in the imaginary object. In a pattern P1 of FIG. 2, the virtual object 1 is an elongated rod. In the pattern P1, the sense of touch relating to the behavior of the grasp portion 5 in collision of an end of the rod with a wall is presented to the operator by the haptic device 10. In a pattern P2 in FIG. 2, the virtual object 1 is a fishing rod. In the pattern P2, the sense of touch relating to the behavior of the grasp portion 5 in bending of the fishing rod is presented to the operator by the haptic device 10. In a pattern P3 of FIG. 2, the virtual object 1 is an elongated rod. In the pattern P3, the sense of touch relating to the behavior of the grasp portion 5 in balancing the longitudinal direction of the rod in a vertical direction is presented to the operator by the haptic device 10. In a pattern P4 of FIG. 2, the virtual object 1 is an elongated rod and a sphere moving on the rod. In the pattern P4, the sense of touch relating to the behavior of the grasp portion 5 in moving the sphere in the longitudinal direction of the rod extending in the horizontal direction is presented to the operator by the haptic device 10. In a pattern P5 of FIG. 2, the virtual object 1 is a rifle. In the pattern P5, the sense of touch relating to the behavior of the grasp portion 5 in shooting the rifle is presented to the operator by the haptic device 10.

To present the behaviors in the grasp portion 5 of the virtual object 1 described above to the operator, as the sense of touch, a haptic system 100 that includes the haptic device 10 and the control device 11, which are configured as described below, is provided in the first embodiment.

Haptic System

Figure 3:
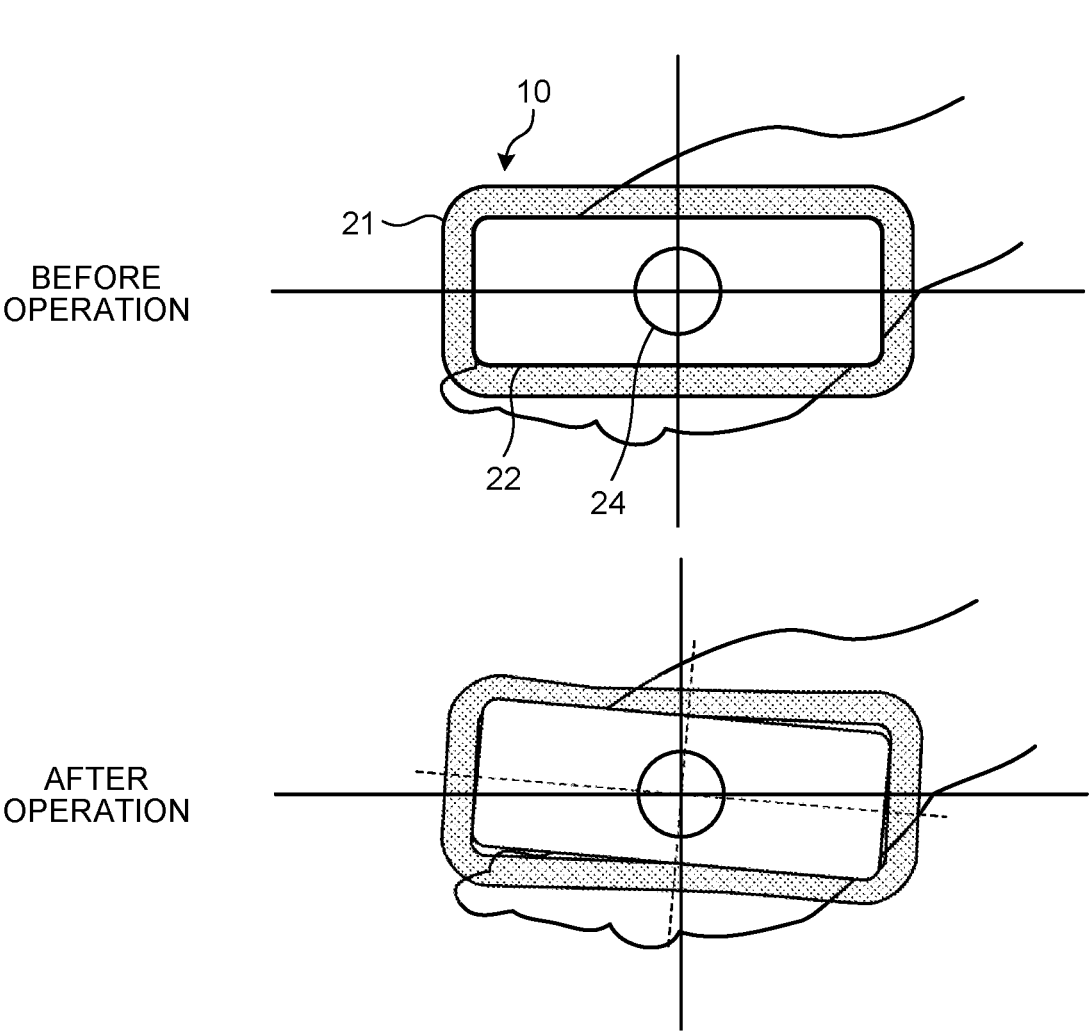
FIG. 3 is a diagram relating to an operation of a haptic device according to a first embodiment of the present disclosure.
Figure 4:
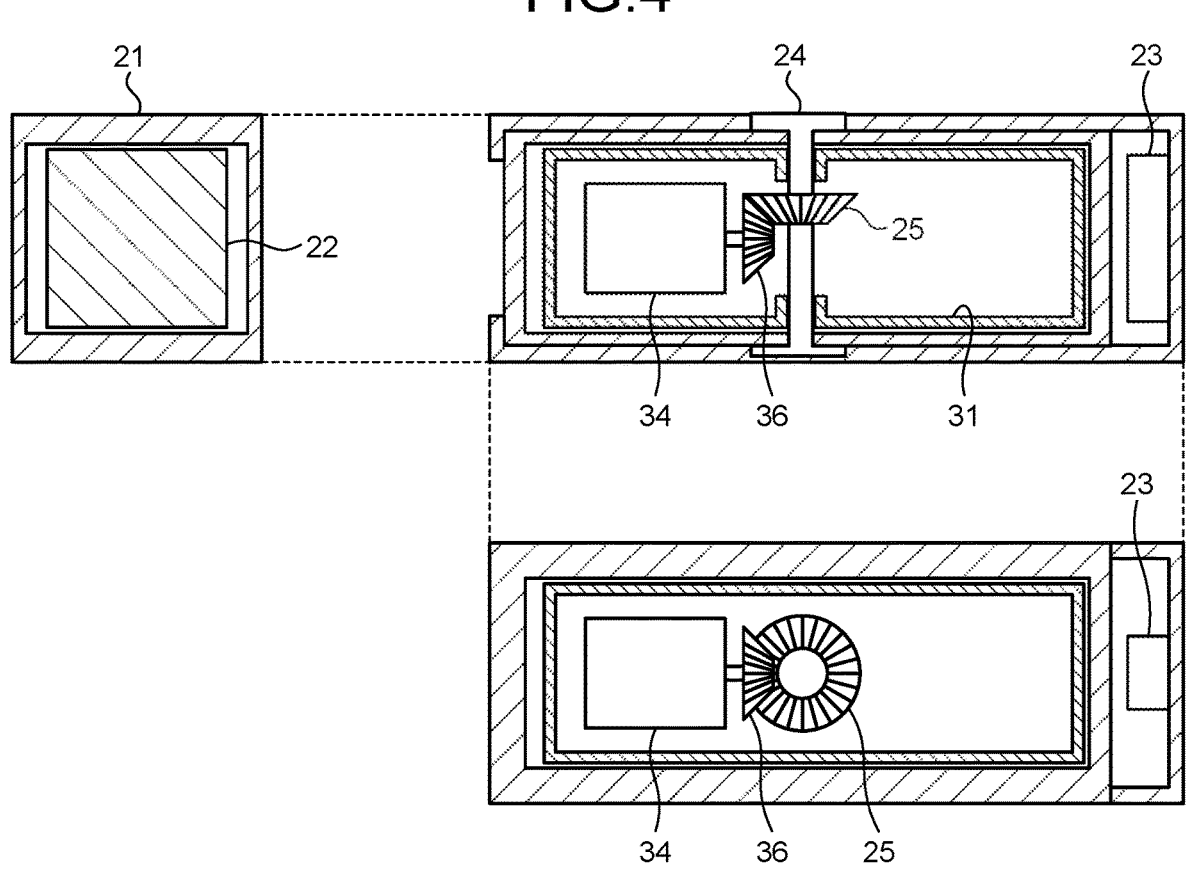
FIG. 4 is a diagram illustrating the haptic device according to the first embodiment of the present disclosure.
Figure 5:
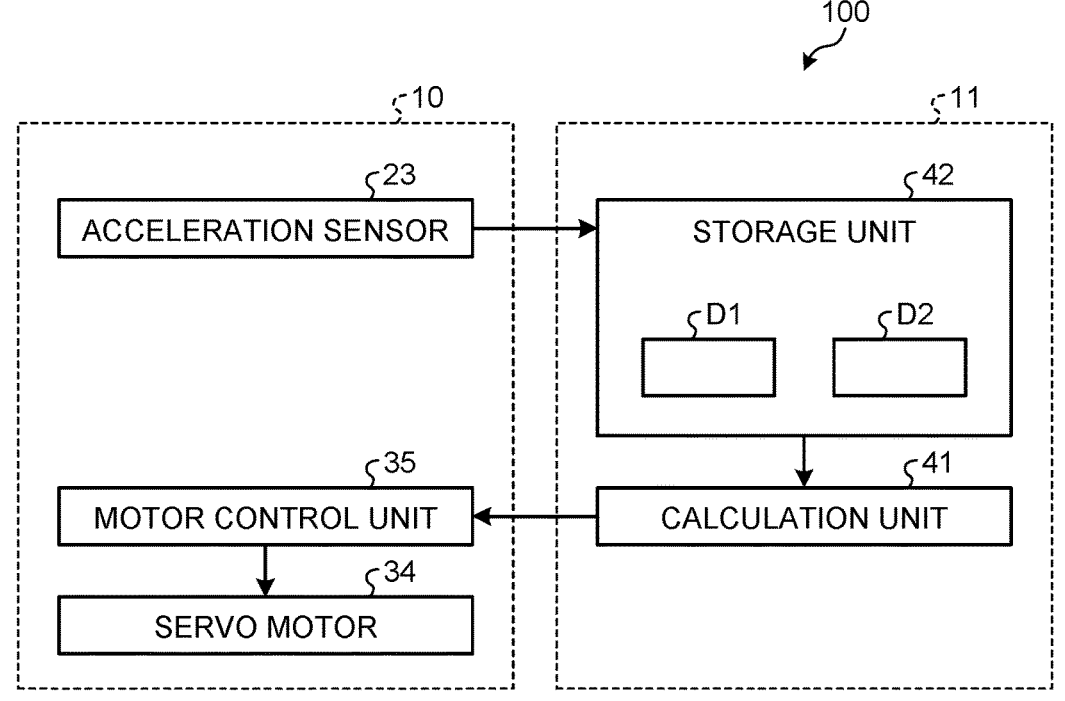
FIG. 5 is a block diagram illustrating the haptic device and a control device according to the first embodiment of the present disclosure.

Next, the haptic system 100 including the haptic device 10 and the control device 11 will be described with reference to FIGS. 3 to 5. FIG. 3 is a diagram relating to an operation of the haptic device according to the first embodiment of the present disclosure. FIG. 4 is a diagram illustrating the haptic device according to the first embodiment of the present disclosure. FIG. 5 is a block diagram illustrating the haptic device and the control device according to the first embodiment of the present disclosure.

As illustrated in FIG. 5, the haptic system 100 includes the haptic device 10 that is operated by the operator, and the control device 11 that controls the haptic device 10. The haptic device 10 and the control device 11 are connected for two-way communication. The haptic device 10 and the control device 11 are connected for wired or wireless communication. Note that the communication connection between the haptic device 10 and the control device 11 may be performed via a server.

Haptic Device

As illustrated in FIG. 4, the haptic device 10 is a device that presents the sense of touch relating to the behavior in the grasp portion 5 of the virtual object 1, to the operator. The haptic device 10 is, for example, a device used in a virtual reality (VR) game. Note that the haptic device 10 may be used in VR other than the game, or may be used in augmented reality (AR). The haptic device 10 includes an external grasp body 21, an internal drive body 22, and a motion detection unit 23. Note that FIG. 4 is a diagram schematically illustrating an internal structure of the haptic device 10 when viewed from the front, the top, and a side surface.

The external grasp body 21 is a portion corresponding to the grip 6 of the virtual object 1. The external grasp body 21 is an outside structure gripped by the operator. The external grasp body 21 is provided so as to cover the internal drive body 22, which is described later, and is provided to extend in a longitudinal direction. The external grasp body 21 is formed of, for example, an elastomer resin. Therefore, the external grasp body 21 has elasticity as compared with the internal drive body 22.

The internal drive body 22 is a portion corresponding to the shaft 7 of the virtual object 1. The internal drive body 22 is provided inside the external grasp body 21 and is provided to extend in a longitudinal direction. The internal drive body 22 is connected to the external grasp body 21 via a connection shaft 24. The internal drive body 22 is movable relative to the external grasp body 21. Specifically, the internal drive body 22 is turnable relative to the external grasp body 21, about the connection shaft 24.

The connection shaft 24 has both axial ends that are fixed to the external grasp body 21. The connection shaft 24 has an axial direction extending in a direction orthogonal to the longitudinal direction of the external grasp body 21. The connection shaft 24 is provided with a connection gear 25 that meshes with a motor gear 36 of the internal drive body 22 which is described later. The connection gear 25 is, for example, a bevel gear.

The internal drive body 22 includes a case 31, a motor 34, the motor gear 36, and a motor control unit 35.

The case 31 is formed of a hard resin that is harder than the external grasp body 21. The case 31 has an internal hollow space. The case 31 is rotatably connected to the connection shaft 24, and stores the connection gear 25 provided on the connection shaft 24.

The motor 34 is a drive source that turns the internal drive body 22 around the connection shaft 24, relative to the external grasp body 21. The motor 34 is fixed inside the case 31. The motor 34 is provided so that the axial direction of a rotation shaft of the motor 34 extends in the same direction as the longitudinal direction of the internal drive body 22.

The motor gear 36 is connected to an output shaft of the motor 34 and is provided so as to mesh with the connection gear 25. The motor gear 36 transmits output from the motor 34 to the connection shaft 24. The motor gear 36 is, for example, a bevel gear. For example, a servo motor is applied to the motor 34. Furthermore, the motor 34 is connected to the motor control unit 35, and the drive of the motor 34 is controlled by the motor control unit 35.

The motor control unit 35 controls the motor 34 and is connected to the control device 11. The motor control unit 35 controls the drive of the motor 34 on the basis of a control signal input from the control device 11.

The motion detection unit 23 detects the motion of the external grasp body 21 imparted by the operator, and for example, an acceleration sensor such as a three-axis acceleration sensor or a gyro sensor is applied to the motion detection unit 23. The motion detection unit 23 may employ any sensor as long as the sensor detects the motion of the external grasp body 21. The motion detection unit 23 is fixedly provided inside the external grasp body 21 and is provided on one longitudinal side of the external grasp body 21. In other words, a space for providing the motion detection unit 23 is formed between the external grasp body 21 and the internal drive body 22, and the motion detection unit 23 is arranged in this space. The motion detection unit 23 is connected to the control device 11 and outputs a result of the detection to the control device 11.

Note that, as long as the space for providing the motion detection unit 23 is formed, portions of the external grasp body 21 and the internal drive body 22, other than the space, may be provided closely or may be provided spaced apart.

Next, the operation of the haptic device 10 will be described with reference to FIG. 3. In the haptic device 10 grasped by the operator before operation, a positional relationship between the external grasp body 21 and the internal drive body 22 is in an initial state. When the operator grasps and operates the haptic device 10, the motion detection unit 23 provided in the external grasp body 21 detects the motion of the external grasp body 21 and outputs the result of the detection to the control device 11. Then, when the control signal is input from the control device 11 to the haptic device 10, the motor control unit 35 controls the motor 34 on the basis of the control signal to present, to the operator, the sense of touch for reproducing the behavior in the grasp portion 5 of the virtual object 1. Specifically, the motor control unit 35 drives the motor 34 and rotates the motor gear 36 to relatively rotate the connection gear 25. Then, the motor control unit 35 turns the internal drive body 22 around the connection shaft 24, relative to the external grasp body 21. Therefore, as illustrated in FIG. 3, the internal drive body 22 of the haptic device 10 appropriately turns about the connection shaft 24, relative to the external grasp body 21, and torsional deformation is generated between the external grasp body 21 and the internal drive body 22.

Control Device

The control device 11 will be described with reference to FIG. 5. The control device 11 generates the control signal for the motor 34 for reproducing the behavior in the grasp portion 5 of the virtual object 1, on the basis of the result of the detection by the motion detection unit 23. The control device 11 includes a calculation unit 41 and a storage unit 42. The control device 11 is a game device.

The calculation unit 41 includes, for example, an integrated circuit such as a central processing unit (CPU). The calculation unit 41 executes a physics engine to calculate the behavior in the grasp portion 5 of the virtual object 1 based on the result of the detection by the motion detection unit 23.

The storage unit 42 stores programs and data. Furthermore, the storage unit 42 may also be used as a work area temporarily storing a result of processing by the calculation unit 41. The storage unit 42 may include, for example, any storage device such as a semiconductor storage device and a magnetic storage device, in addition to a volatile memory such as random access memory (RAM), and a non-volatile memory such as a read only memory (ROM). Furthermore, the storage unit 42 may include a plurality of types of storage devices. Furthermore, the storage unit 42 may include a combination of a portable storage medium such as a memory card, and a reading device for the storage medium.

The storage unit 42 stores, as the data, data D1 about physical quantities of the virtual object 1 and data D2 about the result of the detection by the motion detection unit 23. The data D1 includes information about the shape of the virtual object 1, the material of the virtual object 1, and the like, as the physical quantities of the virtual object 1. The shape of the virtual object 1 is a length or the like in the longitudinal direction of the virtual object 1. The material of the virtual object 1 is an elastic coefficient or the like of the material. The data D1 is data input in advance and stored in the storage unit 42. In a case where the motion detection unit 23 is the acceleration sensor, the data D2 is information about a temporal change in acceleration. The data D2 is data acquired in real time from the motion detection unit 23.

In the control device 11 configured as described above, when the result of the detection by the motion detection unit 23 is input from the haptic device 10, the calculation unit 41 acquires the data D1 stored in the storage unit 42 and the data D2 being the result of the detection by the motion detection unit 23. The calculation unit 41 performs a physical operation by the physics engine, with the data D1 and the data D2 as inputs, calculates the behavior of the virtual object 1 to be reproduced and calculates the behavior of the grasp portion 5 on the basis of the behavior of the virtual object 1, and acquires a relative displacement between the grip 6 and the shaft 7 in the grasp portion 5 as the behavior of the grasp portion 5 of the virtual object 1. The calculation unit 41 generates a signal relating to the relative displacement of the grasp portion 5 to be reproduced, as the control signal, and outputs the control signal to the motor control unit 35 of the haptic device 10.

Motion of Haptic Device

Figure 6:
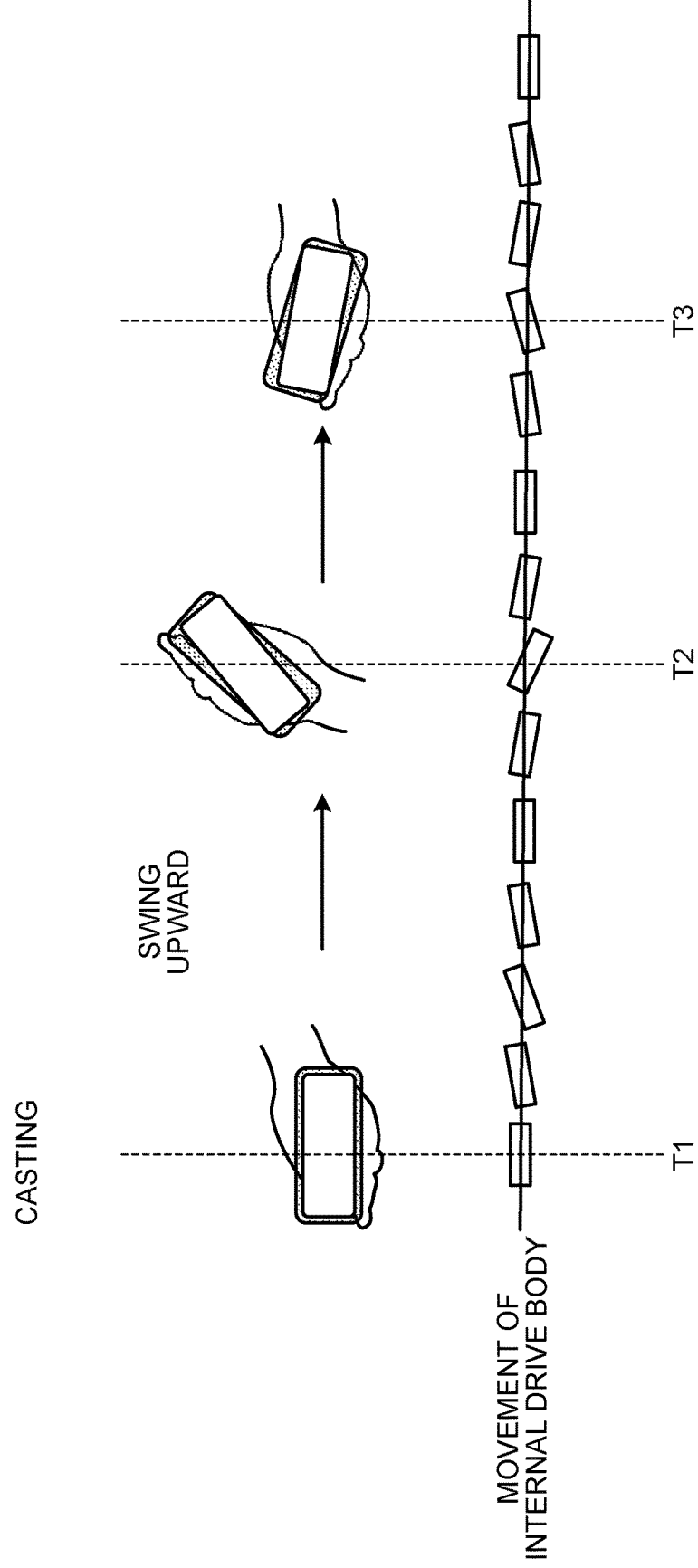
FIG. 6 is a diagram illustrating an example of an operation of the haptic device and the motion of an internal drive body.
Figure 7:
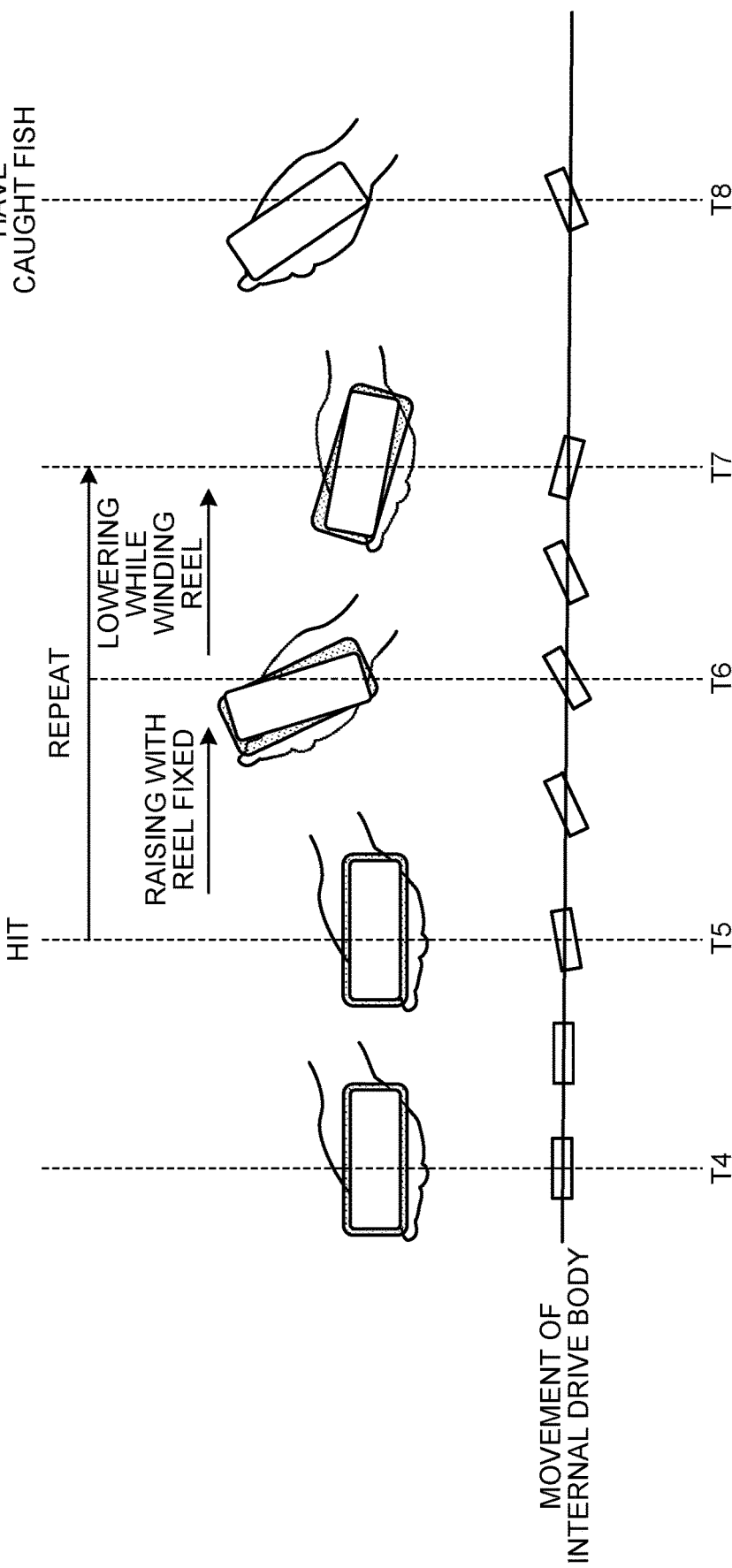
FIG. 7 is a diagram illustrating an example of an operation of the haptic device and the motion of the internal drive body.

Next, the operation of the haptic device 10 and the movement of the internal drive body 22 will be described with reference to FIGS. 6 and 7. FIGS. 6 and 7 are diagrams each illustrating an example of the operation of the haptic device and the motion of the internal drive body. In FIGS. 6 and 7, the fishing rod is applied to the virtual object 1, and the behavior of the fishing rod is reproduced. Specifically, FIG. 6 is a diagram illustrating reproduction of the behavior of a grip of the fishing rod upon casting, and FIG. 7 is a diagram illustrating reproduction of the behavior of the grip of the fishing rod upon catching a fish. In FIGS. 6 and 7, time passes from the left side to the right side. Here, the grip 6 of the fishing rod corresponds to the external grasp body 21, and the shaft (rod) 7 of the fishing rod corresponds to the internal drive body 22.

In FIG. 6, time T1 represents an initial state of the fishing rod, that is, the initial state of the haptic device 10. In FIG. 6, time T2 represents the time at which the fishing rod is swung upward and stopped. In FIG. 6, time T3 represents the time at which the fishing rod is swung downward and casted. When the state of the external grasp body 21 of the haptic device 10 transitions from time T1 to time T2, the acceleration of the external grasp body 21 detected by the motion detection unit 23 becomes zero at time T1. Then, in the external grasp body 21, a displacement in the acceleration caused by the swinging of the haptic device 10 upward increases and reaches a peak of the acceleration, the displacement in the acceleration decreases after reaching the peak, and the acceleration detected by the motion detection unit 23 becomes zero at time T2.

At this time, the internal drive body 22 of the haptic device 10 has a relative displacement to the external grasp body 21 of zero at time T1. Thereafter, when the state of the external grasp body 21 transitions from time T1 to time T2, the movement of the internal drive body 22 is delayed from the movement of the external grasp body 21, and a delayed displacement relative to the external grasp body 21 occurs. Then, the internal drive body 22 has a relative displacement to the external grasp body 21 of zero, near the peak of the acceleration of the external grasp body 21. Thereafter, when the acceleration of the external grasp body 21 decreases to zero, the internal drive body 22 moves prior to the movement of the external grasp body 21 due to inertia, and an advanced displacement relative to the external grasp body 21 occurs.

When the state of the external grasp body 21 of the haptic device 10 transitions from time T2 to time T3, the acceleration of the external grasp body 21 detected by the motion detection unit 23 becomes zero at time T2. Then, in the external grasp body 21, a displacement in the acceleration caused by the swinging of the haptic device 10 downward increases and reaches the peak of the acceleration, the displacement in the acceleration decreases after reaching the peak, and the acceleration detected by the motion detection unit 23 becomes zero at time T3.

At this time, the internal drive body 22 of the haptic device 10 has a relative displacement to the external grasp body 21 of zero at time T2. Thereafter, when the state of the external grasp body 21 transitions from time T1 to time T2, the movement of the internal drive body 22 is delayed from the movement of the external grasp body 21, and the delayed displacement relative to the external grasp body 21 occurs. Then, the internal drive body 22 has a relative displacement to the external grasp body 21 of zero, near the peak of the acceleration of the external grasp body 21. Thereafter, when the acceleration of the external grasp body 21 decreases to zero, the internal drive body 22 moves prior to the movement of the external grasp body 21 due to inertia, and the advanced displacement relative to the external grasp body 21 occurs.

In FIG. 7, time T4 represents an initial state of the fishing rod after casting, that is, the initial state of the haptic device 10, and in FIG. 7, time T5 represents the time at which the fishing rod has a hit. In FIG. 7, time T6 represents the time at which the fishing rod is raised and stopped with a reel provided on the fishing rod fixed. In FIG. 7, time T7 represents the time at which the fishing rod is lowered and stopped while winding the reel. In FIG. 7, time T8 represents the time at which the fishing rod is raised and stopped.

When the state of the external grasp body 21 of the haptic device 10 transitions from time T4 to time T5, the acceleration of the external grasp body 21 detected by the motion detection unit 23 at time T4 becomes zero. Furthermore, the acceleration detected by the motion detection unit 23 of the external grasp body 21 also becomes zero at time T5. Then, in the external grasp body 21, the acceleration caused by the raising of the haptic device 10 increases and reaches the peak of the acceleration, the acceleration decreases after reaching the peak, and the acceleration detected by the motion detection unit 23 becomes zero at time T6. Next, in the external grasp body 21, the acceleration caused by the lowering of the haptic device 10 increases and reaches the peak of the acceleration, the acceleration decreases after reaching the peak, and the acceleration detected by the motion detection unit 23 becomes zero at time T7. Time T5 to time T7 are repeated until catching a fish. Then, in the external grasp body 21, the haptic device 10 is in a state of catching a fish at time T8 and the acceleration detected by the motion detection unit 23 becomes zero.

At this time, the internal drive body 22 of the haptic device 10 has a relative displacement to the external grasp body 21 of zero, from time T4 to time T5. Thereafter, when the state of the external grasp body 21 reaches time T5, the internal drive body 22 moves prior to the movement of the external grasp body 21, and the advanced displacement relative to the external grasp body 21 occurs. When the state of the internal drive body 22 transitions from time T5 to time T6, a force to stay acts on the internal drive body 22, and the advanced displacement relative to the external grasp body 21 increases. When the state of the internal drive body 22 transitions from time T6 to time T7, a force acting on the fishing rod decreases and a displacement relative to the external grasp body 21 decreases, and therefore, the delayed displacement relative to the external grasp body 21 occurs. When the state of the internal drive body 22 transitions from time T7 to time T8, the force acting on the fishing rod increases, and the internal drive body 22 moves prior to the movement of the external grasp body 21, and the advanced displacement relative to the external grasp body 21 occurs, as in the state at time T6.

Control Method for Haptic Device

Figure 8:
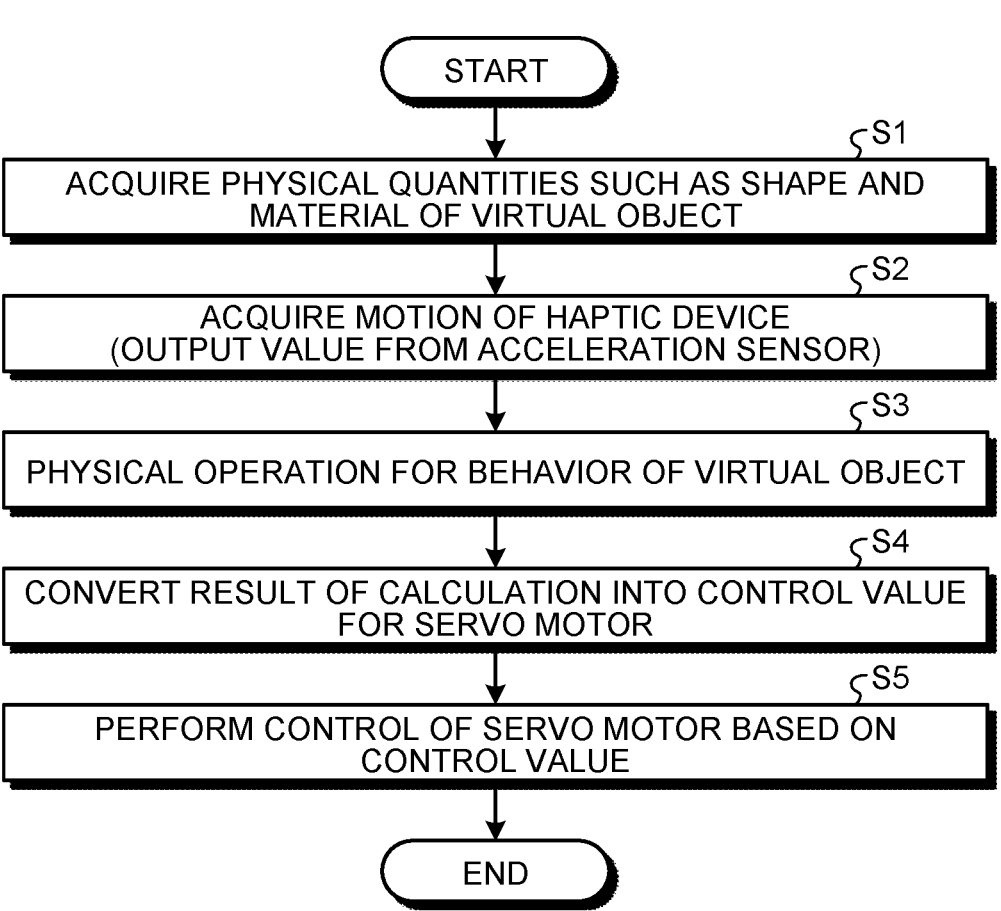
FIG. 8 is a flowchart relating to a control method for the haptic device according to the first embodiment of the present disclosure.

Next, a control method for the haptic device 10 will be described with reference to FIG. 8. FIG. 8 is a flowchart relating to a control method for the haptic device according to the first embodiment of the present disclosure.

In the control method for the haptic device 10, first, the calculation unit 41 of the control device 11 acquires the data D1 about the physical quantities of the virtual object 1, from the storage unit 42 (Step S1). Next, the calculation unit 41 acquires the motion of the haptic device 10 that is the result of the detection by the motion detection unit 23 (Step S2). Then, the calculation unit 41 performs physical operation for reproducing the behavior of the virtual object 1, on the basis of the data D1 and the data D2 (Step S3). In Step S3, the behavior in the grasp portion 5 of the virtual object 1 is also calculated by performing the physical operation for the behavior of the virtual object 1. Then, the calculation unit 41 generates the control signal for the motor 34 based on a calculation result of the physical operation, and outputs the generated control signal to the motor control unit 35 of the haptic device 10. When acquiring the control signal, the motor control unit 35 generates a control value for controlling the drive of the motor 34, on the basis of the control signal. In other words, the motor control unit 35 converts the calculation result of the physical operation into the control value for the motor 34 (Step S4). Then, the motor control unit 35 controls the drive of the motor 34 on the basis of the control value (Step S5). Thus, the haptic device 10 presents the sense of touch relating to the behavior in the grasp portion 5 of the virtual object 1, to the operator.

As described above, according to the first embodiment, it is possible to present the sense of touch relating to the behavior in the grasp portion 5 of the virtual object 1 that is the imaginary object, to the operator.

Furthermore, in the first embodiment, the connection shaft 24 can be set in a direction orthogonal to the longitudinal direction of the external grasp body 21 and the internal drive body 22. Therefore, it is possible to suitably present the sense of touch to the operator with a simple operation of turning the internal drive body 22 relative to the external grasp body 21.

Furthermore, in the first embodiment, the external grasp body 21 formed of the elastomer resin makes it possible to generate a displacement such as torsional deformation between the external grasp body 21 and the internal drive body 22, even in a contact state with the internal drive body 22.

Furthermore, in the first embodiment, the application of the acceleration sensor as the motion detection unit 23 makes it possible to detect the motion of the external grasp body 21, as acceleration.

Note that in the first embodiment, the external grasp body 21 is formed of the elastomer resin, but may be formed of a hard resin, as in the case 31 of the internal drive body 22. In this case, it is preferable to provide a gap between the external grasp body 21 and the internal drive body 22 so as to allow relative displacement between the external grasp body 21 and the internal drive body 22.

Second Embodiment

Figure 9:
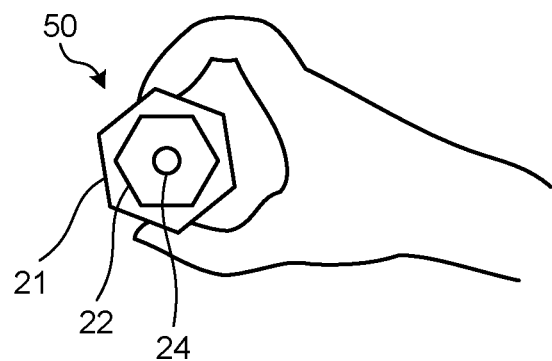
FIG. 9 is a diagram illustrating an example of a haptic device according to a second embodiment of the present disclosure.

Next, a haptic device 50 according to a second embodiment will be described with reference to FIG. 9. Note that in the second embodiment, in order to avoid redundant description, portions different from those of the first embodiment will be described, and portions having configurations similar to those of the first embodiment will be described with the same reference numerals. FIG. 9 is a diagram illustrating the haptic device according to the second embodiment of the present disclosure.

In the haptic device 50 of the second embodiment, the connection shaft 24 has an axial direction set in a direction the same as the longitudinal direction of the external grasp body 21 and the internal drive body 22. In other words, the connection shaft 24 is provided to extend in the longitudinal direction of the external grasp body 21, and has both axial ends that are fixed to the external grasp body 21. The internal drive body 22 is rotatable relative to the connection shaft 24. Note that the connection gear 25 and the motor gear 36 may have gear arrangement so as to rotate the connection shaft 24. For example, a spur gear may be used to have a configuration in which output from the motor 34 is allowed be transmitted even if the output shaft of the motor 34 is parallel to the connection shaft 24.

As described above, in the second embodiment, the connection shaft 24 can be set in a direction the same as each of the longitudinal directions of the external grasp body 21 and the internal drive body 22. Therefore, a simple motion of turning the internal drive body 22 relative to the external grasp body 21 makes it possible to present a sense of touch different from that of the first embodiment to the operator.

Note that the present invention is not limited by the above embodiments. In addition, the component elements in the embodiments include component elements that are readily replaceable by those skilled in the art or that are substantially equivalent. Furthermore, component elements described below can be combined as appropriate, and if there are a plurality of embodiments, the components can be combined with each other as well.

For example, the first embodiment and the second embodiment may be combined to each other. In other words, one or more connection shafts 24 may be used. In other words, a plurality of the connection shafts 24 may be used to form a multi-shaft configuration. In this configuration, the axial directions of the connection shafts 24 may be set in the same direction or different directions, and are not particularly limited. If the axial directions of the connection shafts 24 are set in different directions, the internal drive body 22 can three-dimensionally turns relative to the external grasp body 21.

Furthermore, in the first embodiment and the second embodiment, the haptic device 10 and the control device 11 are separated from each other, but the haptic device 10 and the control device 11 may be integrated with each other. In other words, the haptic device 10 may be configured to include a control unit that functions as the control device 11.

As described above, the present disclosure can also have the following configurations.

(1)
A haptic device comprising:
an external grasp body that is positioned on an outside, formed as a grasp portion of an imaginary object, and grasped by an operator;
a motion detection unit that is provided in the external grasp body to detect a motion of the external grasp body; and
an internal drive body that is provided in the external grasp body, connected to the external grasp body, and moves relative to the external grasp body based on a result of the detection by the motion detection unit.

(2)
The haptic device according to (1), wherein
the external grasp body and the internal drive body are connected via a connection shaft and are each provided to extend in a longitudinal direction, and
the connection shaft extends in a direction orthogonal to the longitudinal direction.

(3)
The haptic device according to (1), wherein
the external grasp body and the internal drive body are connected via a connection shaft and are each provided to extend in a longitudinal direction, and
the connection shaft extends in the same direction as the longitudinal direction.

(4)
The haptic device according to (1), wherein
the external grasp body includes an elastomer resin.

(5)
The haptic device according to (1), wherein
the external grasp body includes a hard resin.

(6)
The haptic device according to (1), wherein
the motion detection unit is an acceleration sensor.

(7)
The haptic device according to (1), further comprising
a control unit that controls the internal drive body,
wherein the control unit
acquires a physical quantity relating to the imaginary object,
acquires the result of the detection by the motion detection unit, generates a control signal for the internal drive body to reproduce a behavior of the imaginary object based on the acquired physical quantity and the acquired result of the detection, and controls the internal drive body based on the generated control signal.

(8)

A control device for a haptic device, the control device controlling the haptic device according to (1), the control device comprising:

acquiring a physical quantity relating to the imaginary object;

acquiring the result of the detection by the motion detection unit;

generating a control signal for the internal drive body to reproduce a behavior of the imaginary object based on the acquired physical quantity and the acquired result of the detection; and controlling the internal drive body based on the generated control signal.

(9)

A control method for a haptic device, the method controlling the haptic device according to (1), the method comprising:

acquiring a physical quantity relating to the imaginary object;

acquiring the result of the detection by the motion detection unit;

generating a control signal for the internal drive body to reproduce a behavior of the imaginary object based on the acquired physical quantity and the acquired result of the detection; and controlling the internal drive body based on the generated control signal.

REFERENCE SIGNS LIST

1 VIRTUAL OBJECT
5 GRASP PORTION
50 HAPTIC DEVICE
11 CONTROL DEVICE
21 EXTERNAL GRASP BODY
22 INTERNAL DRIVE BODY
23 MOTION DETECTION UNIT
24 CONNECTION SHAFT
34 MOTOR
35 MOTOR CONTROL UNIT
41 CALCULATION UNIT
42 STORAGE UNIT

The invention claimed is:

1. A haptic device, comprising:

an external grasp body, wherein the external grasp body, as a grasp portion, is on an outside of an imaginary object, and the external grasp body is grasped by an operator;

a motion detection unit configured to detect a motion of the external grasp body, wherein the motion detection unit is in the external grasp body;

an internal drive body configured to move relative to the external grasp body based on a result of the detection, wherein the internal drive body is in the external grasp body; and a connection shaft, wherein the external grasp body and the internal drive body are connected via the connection shaft, and the internal drive body is turnable around the connection shaft, relative to the external grasp body.

2. The haptic device according to claim 1, wherein each of the external grasp body and the internal drive body extends in a longitudinal direction, and the connection shaft extends in a direction orthogonal to the longitudinal direction.

3. The haptic device according to claim 1, wherein each of the external grasp body and the internal drive body extends in a longitudinal direction, and the connection shaft extends in a same direction as the longitudinal direction.

4. The haptic device according to claim 1, wherein the external grasp body includes an elastomer resin.

5. The haptic device according to claim 1, wherein the external grasp body includes a hard resin.

6. The haptic device according to claim 1, wherein the motion detection unit is an acceleration sensor.

7. The haptic device according to claim 1, further comprising a control unit configured to:

control the internal drive body;

acquire a physical quantity relating to the imaginary object;

acquire the result of the detection;

generate a control signal, based on the acquired physical quantity and the acquired result of the detection, for the internal drive body to reproduce a behavior of the imaginary object; and control the internal drive body based on the generated control signal.

8. A control device for the haptic device according to claim 1, the control device comprising:

circuitry configured to:

control the haptic device;

acquire a physical quantity relating to the imaginary object;

acquire the result of the detection;

generate a control signal, based on the acquired physical quantity and the acquired result of the detection, for the internal drive body to reproduce a behavior of the imaginary object; and control the internal drive body based on the generated control signal.

9. A control method, comprising:

controlling the haptic device according to claim 1;

acquiring a physical quantity relating to the imaginary object;

acquiring the result of the detection;

generating a control signal, based on the acquired physical quantity and the acquired result of the detection, for the internal drive body to reproduce a behavior of the imaginary object; and controlling the internal drive body based on the generated control signal.

* * * * *